United States Patent [19]

Hair, Jr. et al.

[11] 3,983,715

[45] Oct. 5, 1976

[54] MOBILE EQUIPMENT AIR-CONDITIONER

[76] Inventors: John E. Hair, Jr., Star Rte., Box 82, Prescott, Wash. 99348; John E. Hair, Sr., 53 S. Clinton; Richard E. Hair, 1809 Brevor Drive, both of Walla Walla, Wash. 99362

[22] Filed: Feb. 7, 1975

[21] Appl. No.: 547,969

Related U.S. Application Data

[63] Continuation-in-part of Ser. No. 436,088, Jan. 24, 1974.

[52] U.S. Cl. .................................. 62/243; 62/323
[51] Int. Cl.² .................. B60H 3/04; F25B 27/00
[58] Field of Search .................. 62/83, 243, 323; 417/203, 429

[56] References Cited
UNITED STATES PATENTS

| | | | |
|---|---|---|---|
| 2,048,026 | 7/1936 | Philipp | 62/83 |
| 2,467,398 | 4/1949 | Miller | 62/243 |
| 2,518,316 | 8/1950 | Henney | 62/243 |
| 2,799,143 | 7/1957 | Weigel | 62/323 |
| 2,888,810 | 6/1959 | Hann | 62/323 |
| 2,899,941 | 8/1959 | Adams | 62/243 |
| 3,365,906 | 1/1968 | Zadig | 62/243 |
| 3,603,105 | 4/1971 | Figa | 62/243 |
| 3,630,003 | 12/1971 | Ashton | 62/243 |
| 3,643,434 | 2/1972 | Widmaier | 417/429 |
| 3,690,789 | 9/1972 | Spence | 417/203 |

Primary Examiner—Lloyd L. King
Attorney, Agent, or Firm—Dawson, Tilton, Fallon & Lungmus

[57] ABSTRACT

An air conditioner is mounted to the roof of an operator's compartment of mobile equipment wherein a hydraulic circuit is empowered by the variable RPM prime mover for the vehicle while the fans and compressor of the unit are driven at a constant speed by means of a single hydraulic motor having an axially vertical shaft journaled in its case and extending above and below the case to drive the evaporator and condenser fans and the compressor.

10 Claims, 9 Drawing Figures

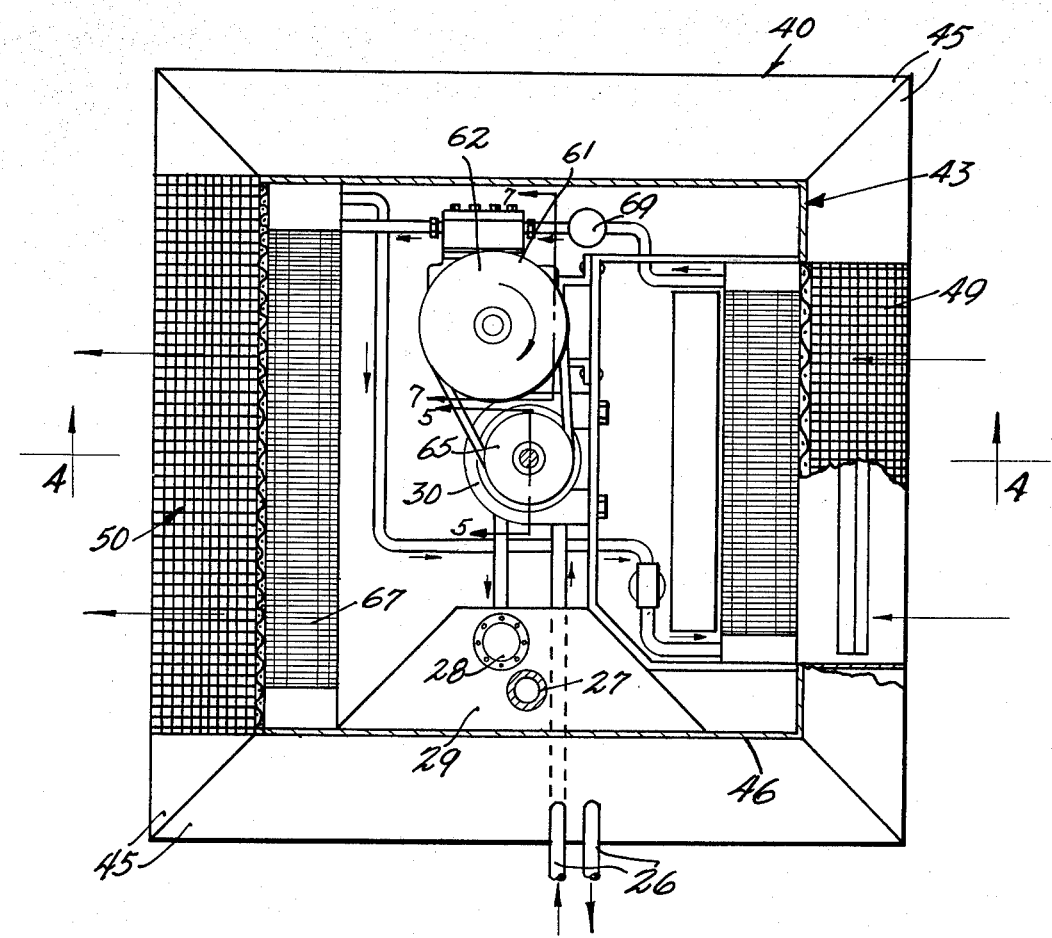
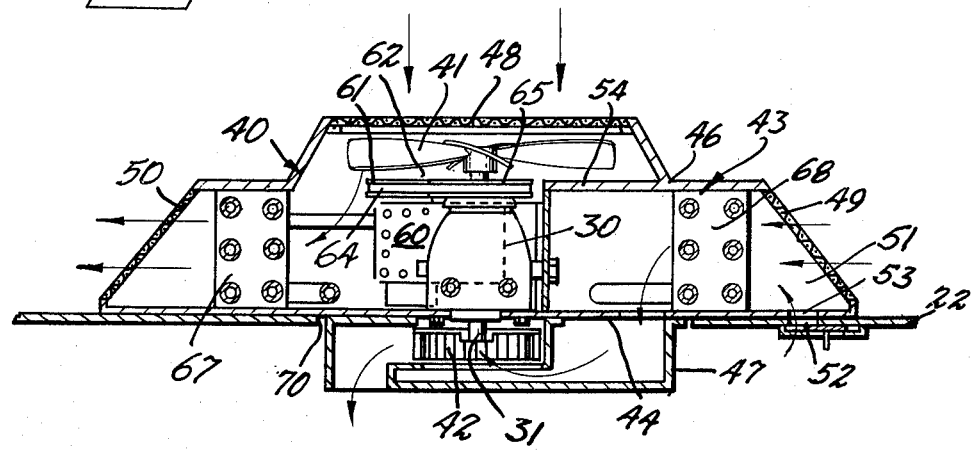

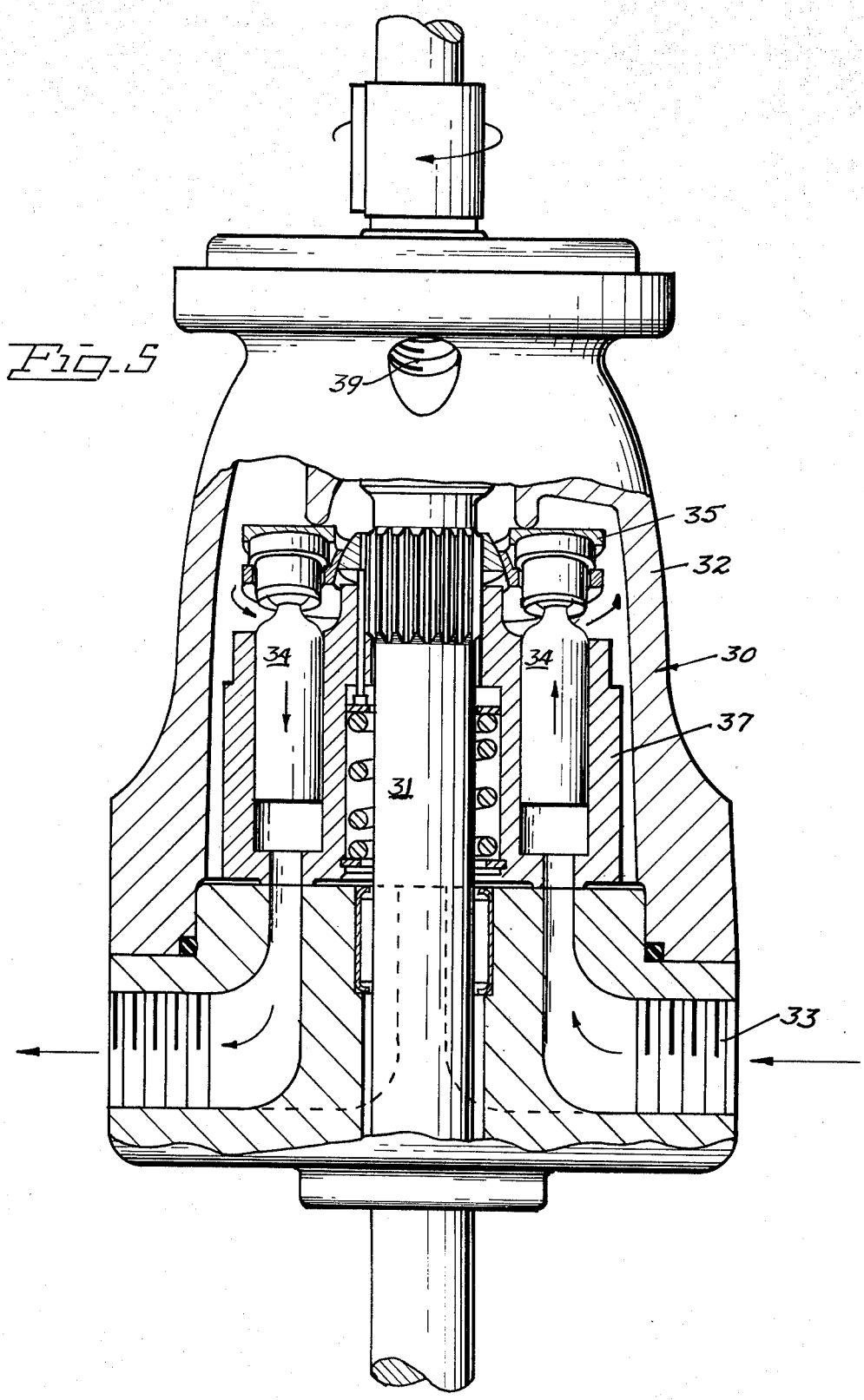

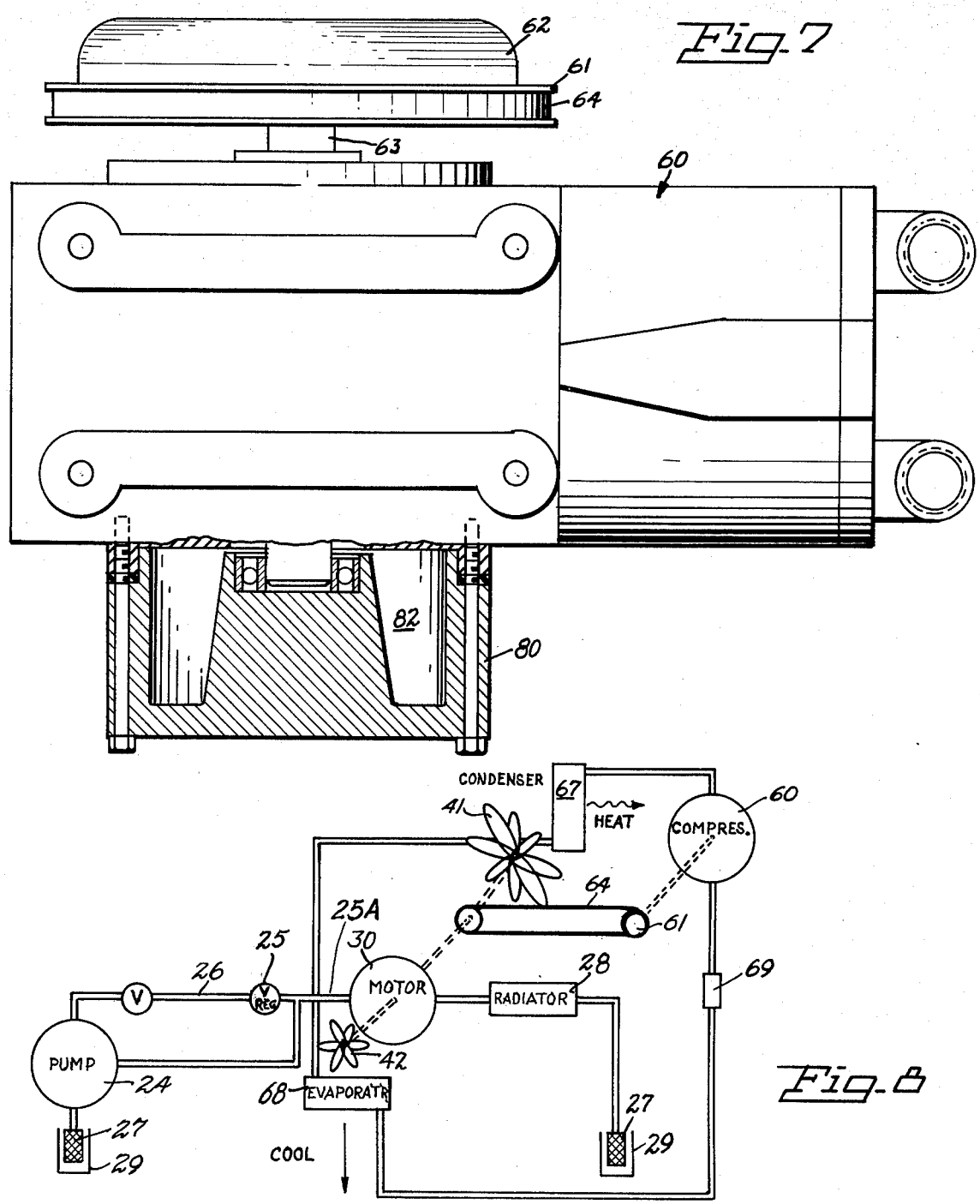

MOBILE EQUIPMENT AIR-CONDITIONER

RELATED APPLICATIONS

This is a continuation-in-part application of our co-pending application entitled Mobile Equipment Air Conditioner, Ser. No. 436,088, filed Jan. 24, 1974, now abandoned.

BACKGROUND OF THE INVENTION

This invention relates to air conditioning systems for cooling the air in and pressurizing an operator's compartment of mobile equipment, particularly large, off-the-road vehicles such as crawler tractors, earth movers, etc.

As a consequence of the recent legislation and the desire to improve working conditions, the demand for apparatus designed to effectively control the atmosphere within the operator's compartment of mobile industrial equipment has become increasingly common.

Attempts have been made to condition air in various vehicles by various means. The well-known system utilizing refrigeration apparatus including, among other things, a motor-driven compressor, an evaporator, a condenser and a motor-driven fan, interrelated to withdraw heat from the air in the area to be cooled and exhaust said heat into the atmosphere by the heat-exchanger principle which employs a fluid refrigerant is, broadly considered, a well-developed art; and it has been often applied to mobile equipment.

In the prevalent commercial applications relating to mobile equipment, it is customary to power the refrigerant compressing unit directly from the prime-mover which is employed to motivate the vehicle. However, in such cases as the speed of the vehicle engine varies, the compressor is driven at corresponding speeds thus effecting fluctuations in the resultant cooling function of the refrigeration systems. The resulting fluctuations are not significant in most cases for on-the-road vehicles where normal use is at higher engine speeds. While cooling in excess of requirements occurs during high engine RPM the resultant atmospheric effect is adequately controlled by utilizing a temperature-responsive clutch mechanism in the power transmission means to the compressor. However, when the engine RPM is low, undercooling results and nothing can be done by the vehicle operator to increase its cooling capacity except to increase the engine RPM. In off-the-road vehicles, the operator's responsibilities of making power and gear ratio changes while manipulating the steering and auxiliary equipment, as for example, a dozer blade's angle and elevation, would be increased to an impossible level were he additionally required to correlate engine RPM to cooling requirements.

To minimize the occurrences of undercooling, it is customary to provide a compressor having a compromise refrigerant delivery capability adequate at moderately low engine RPM and then increase the "idle" ENGINE RPM somewhat to minimize the ENGINE RPM segment between its idle speed and the minimum compressor speed, adequate to properly cool the operator's compartment during periods of maximum possible ambient temperatures. This practice requires greater compressor delivery capability than required where the compressor is continuously driven at its optimum design speed. Thus, the initial cost of an over-size compressor must be borne by the vehicle purchaser.

Furthermore, since the prevalent mobile equipment air conditioner is driven by a variable speed power source, it would compound the cooling capacity inadequacies to permit the air circulation to vary directly proportional to the air conditioner's undercooling. In other words, when the compressor's capacity to provide heat-exchanging refrigerant diminishes, and the air circulation diminishes proportionately, the rate of temperature increase in the operator's compartment will accelerate proportionately from external heat sources. To overcome this undesirable effect, it is customary to drive the air circulating fans from the vehicle's electrical system, utilizing the battery to maintain a constant power source even though the electrical supply from the generator or alternator may vary with the engine RPM.

As before, the cost to the vehicle buyer is increased because of the necessity for adding or increasing the capacity of an electrical system as well as the time involvement and expense of maintaining a secondary power source and its attendant apparatus.

Another problem with air conditioners used on off-the-road vehicles is caused by the dust raised by the vehicle. This dust has a tendency to be sucked into the unit by the evaporator fan, thus accumulating within the unit and clogging the filters.

SUMMARY OF THE INVENTION

The present invention provides a unique combination of apparatus for air conditioning the operator's compartment of mobile equipment wherein the compressor and air circulating fans are operated at a constant speed by means of a single hydraulic motor which operates at constant speed independently of variations in the speed of the vehicle's engine.

The present invention provides a hydraulic pump driven by the vehicle's engine and adapted to deliver a regulated constant flow of hydraulic fluid to the hydraulic motor independent of load. Thus, the compressor may be turned off, for example, and the fan circulating compartment air for pressurizing the operator's compartment will not be affected.

A unique hydraulic motor is incorporated in the present system to function efficiently in the aforesaid combination with the axis of its shaft disposed vertically; and it is adapted to drive a compressor and two independent fans simultaneously—one above the vehicle's roof to circulate atmospheric air through the condenser and the other beneath the roof to circulate compartment air or a combination of compartment air and fresh air through the evaporator.

Further, the present invention provides a roof air conditioner for a vehicle which has been shown to be very reliable under the rugged use conditions of off-the-road vehicles.

Other features and advantages of the subject invention will be apparent to those skilled in the art from the following detailed description accompanied by the drawing in which like reference numerals are employed to designate similar parts in the various drawings.

THE DRAWING

FIG. 3 is a horizontal plan view partially in section as at line 3—3 of FIG. 1 and upon an enlarged scale;

FIG. 4 is a vertical section through the compartment roof and air-conditioner as at line 4—4 of FIG. 4;

FIG. 5 is an enlarged cross sectional view of the motor, partially in section as at line 5—5 of FIG. 3;

FIG. 7 is a vertical view of the compressor partially in section as at line 7—7 of FIG. 3; and FIG. 8 is a schematic of the hydraulic refrigerant fluid systems.

DETAILED DESCRIPTION

Figure 1:
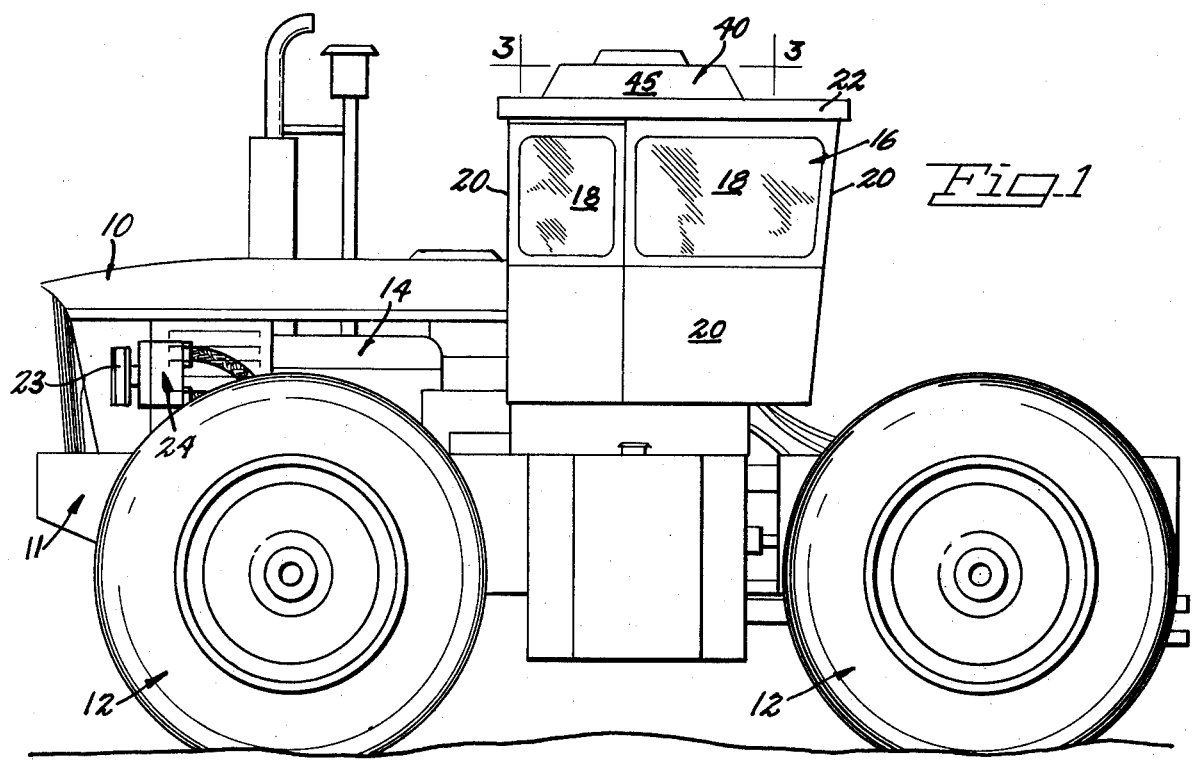
FIG. 1 is a side view of a rubber-tired vehicle having an operator's compartment with an air conditioner constructed according to the present invention mounted on the roof.
Figure 1A:
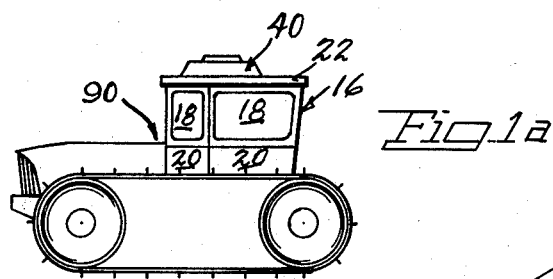
FIG. 1A is a side view of a track-type tractor similarly equipped.
Figure 2:
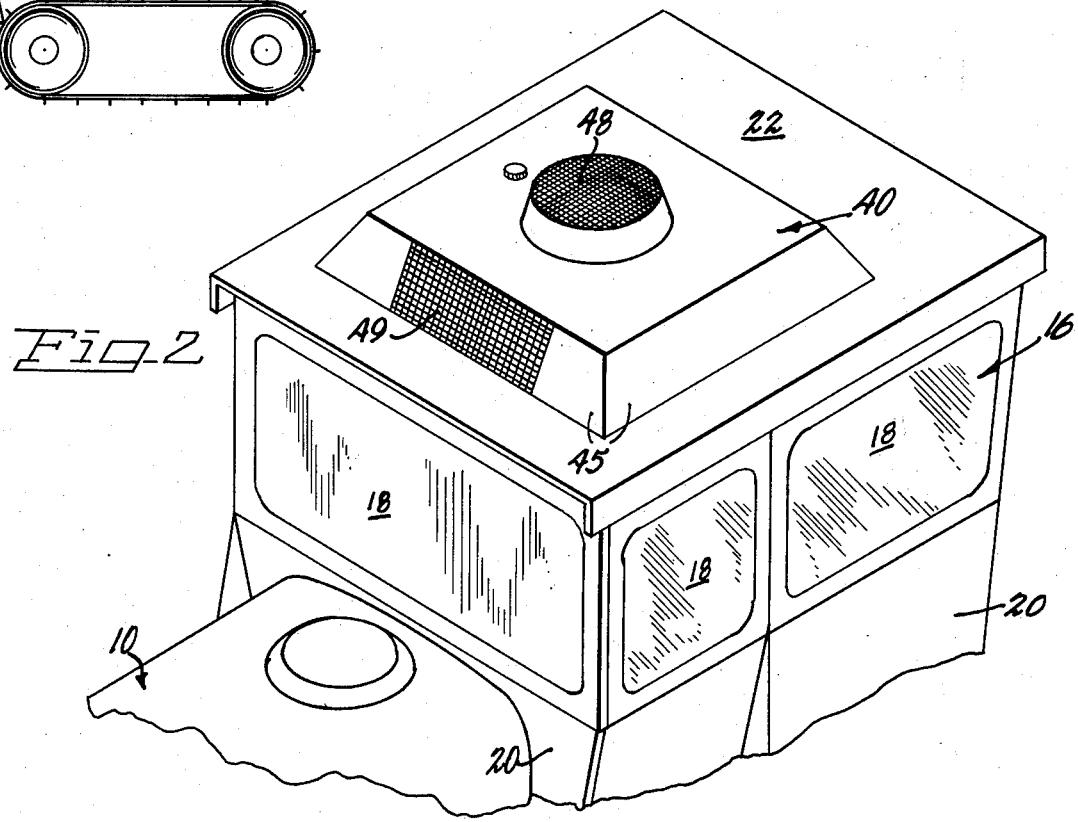
FIG. 2 is a fragmentary perspective view of the unitary air conditioner on the operator's compartment roof.
Figure 6:
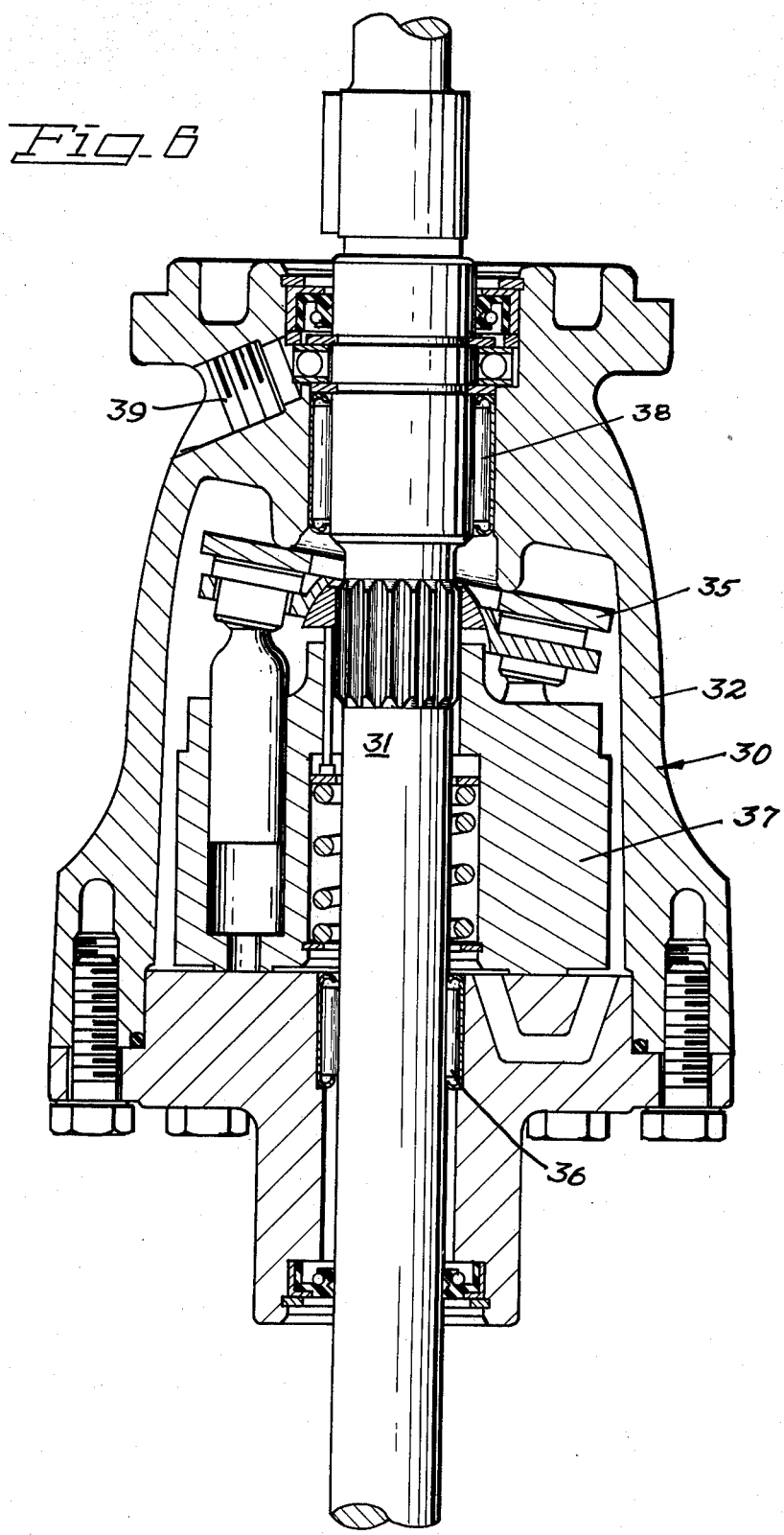
FIG. 6 is a similar view of the motor on the same scale as FIG. 5 and taken on a plane 90° from the plane indicated by line 5—5 of FIG. 3.

Referring now to FIG. 1, we have shown a stylized representation of a rubber-tired tractor indicated in its entirety by the reference numeral 10 and including ground engaging wheels 12—12, steerable by any one of the well-known steering systems common to the art and therefore not shown herein. The tractor also has a prime mover or engine 14 which is coupled to drive at least one lateral pair of wheels 12—12 through the usual gear boxes and speed changers (not shown).

As is customary, the controls (not shown) for manipulating and steering the tractor 10 are disposed within an enclosed cab or operator's compartment 16 having windows 18—18 in its side walls 20—20. A roof 22 covers the top to make a substantially closed compartment.

A hydraulic pump 24 is carried by the chassis 11 of the tractor and is driven by a power transmission element such as a V-belt 23 which in turn is driven by the engine 14. The pump 24 may be a pump manufactured under the designated Model No. PFC 116 by the Spencer Fluid Power Division of Spencer Aircraft Industries, having its main office at 8410 Dallas Avenue South, Seattle, Washington, which pump is readily available on the commercial market.

This pump is flow regulated—that is to say, that it includes a feedback signal which adjusts the cam angle of a swash plate to regulate the flow to a constant value. Thus, the output flow rate is constant, and it is independent of speed variations of the input shaft which is driven by the vehicle's engine.

The feedback signal is the pressure in a hydraulic line called the "sensor" line (designated 25A in FIG. 8); and the pressure signal is developed across an adjustable orifice in the output line of the pump, which orifice is part of a manually adjustable valve (i.e., control valve 25 in FIG. 8). Thus, the output flow rate of the pump is constant once the valve is set, but the flow rate may be adjusted within design range of the valve.

Briefly, the pump 24 employs a spring-biased spool for positioning an adjustable swash plate. The differential pressure across the variable orifice in control valve 25 is transmitted through the sensor line 25A to work against the the spring in adjusting the swash plate. If the speed of the pump is low so that feedback pressure is less than 200 psi, the spring adjusts the cam angle of the swash plate to increase stroke and, thus, output. If the speed of the pump is high so that the feedback pressure exceeds 200 psi, the excess pressure is similarly used to de-stroke the pump so that output flow rate remains constant.

Thus, for example, during start-up, the pump will go on maximum stroke; and as the flow increases, the pressure across the orifice will increase, causing the pump to decrease its stroke until the force of the spring is in equilibrium with the force caused by the pressure in the sensor line. This is irrespective of load and irrespective of input speed of the pump shaft. As the orifice is reduced, a reduced flow will create the 200 psi feedback pressure; and the pump output will therefore be regulated at the reduced flow setting.

The pump 24 is also "pressure-compensated" in the sense that should the output pressure exceed a predetermined limit (e.g., 2700 psi), the pump will automatically go to zero stroke. This is important in that should the compressor or motor become locked, the pump will not be overloaded for an extended period or cause other damage to the system. It is also advantageous in that by closing the output line, for example, the operator can de-stroke the pump to a "standby" condition utilizing much less power. A manual or solenoid shut-off valve in the position V of FIG. 8 may be used for this purpose and is preferred to closing the adjustable valve 25 which would require resetting each time the system is used. Alternatively, such shut-off valve (manual or electrical) could be inserted in the sensor line 25A since zero pressure in the sensor line also de-strokes the pump.

Thus, pump 24 and associated control elements form a system which will self-adjust to regulate hydraulic fluid flow to a constant value, as determined by the setting of the variable orifice in valve 25. If the control valve 25 (FIG. 8) is adjusted so substantially no hydraulic oil is required, the pump goes into "standby" at a greatly reduced pressure by automatically positioning the cam angle of a swash plate. As the valve 25 is adjusted to permit passage of more hydraulic oil, say for example, 7 GPM at 1100 psi, the control elements described will re-position the pump swash plate to deliver the requirement dictated by the setting of the orifice of valve 25. The operating pressure has no effect on the flow rate. The flow is regulated by apparatus built into the pump which senses the pressure differential between the pump output and the output port of valve 25, so that it delivers the required flow of oil at whatever pressure is needed as predetermined by control valve 25, without power-consuming by-pass valves.

Hydraulic conduit 26 couples fluid from the pump 24 through a motor 30, a radiator 28 and back to the reservoir or sump 29 through filters 27—27. The motor 30 is thus driven at a constant speed as determined by the setting of the orifice in valve 25.

Inspection of FIGS. 4 and 5 will reveal that motor 30 has advantageous features in that it is designed with its shaft 31 extending from the housing 32 at both the upper and lower ends. This permits mounting the evaporator fan to one end of the vertical shaft, while mounting the condenser fan to the other end of the shaft. Thus, with the fans in superposed relation, the coupling of room air to the lower one and atmospheric air to the upper one is accomplished wherein the fan mountings can be direct couplings, without intervening pulleys, bends, etc., thereby minimizing the number of parts and belts which decrease reliability of operation.

The hydraulic fluid enters inlet 33 pressurizing piston 34 which reacts against the inclined swash plate or cam 35 to convert the rectilinear movement of the piston 34 to a rotary motion of the shaft 31 in a common and well-known manner. The lower bearing 36 is lubricated by the fluid which escapes between the rotor 37 and the housing 32. The upper bearing 38 would normally remain dry except that a case drain 39 is disposed above the bearing 36 and the fluid escaping is forced past the bearing to the drain 39 thus lubricating the bearing 38. Hydraulic motors are normally operated with their shafts horizontal to utilize the effects of gravity to direct the flow of lubricating hydraulic fluid.

Inspection of FIGS. 3 and 4 will reveal the unique unitary air conditioner 40 which is adapted to mount upon the roof 22 of the mobile equipment 10. Motor 30 has fixed upon the respective upper and lower ends of its shaft 31 fans 41 and 42. The upper fan 41 is a blade-type fan having a diameter of approximately 14 inches diameter which at 2000 RPM will deliver adequate evaporative cooling.

The lower fan 42 may be a blade-type fan but for space reasons we prefer to use a squirrel-cage type fan. Fan 42 may be in this example about two inches axially of its direction of rotation and about 9 inches in diameter. Fan 41 is located at the top of the vertical shaft 31 for circulating atmospheric air through a condenser coil 67; and fan 42 is located at the lower end of shaft 31 for moving adequate filtered air through an evaporator coil 68 and into the operator's compartment. The latter could contain some atmospheric air, if desired; and it preferably does contain some external air so that the cabin is "pressurized" to slightly create a positive force to keep dust and dirt out. It will be observed that fans 41, 42 are directly mounted to the shaft 31 of motor 30 (FIG. 4).

The motor 30 and its associated fans 41 and 42 are mounted in a frame 43 having a bottom wall 44, angled side walls 45—45, a top 46 and a lower fan housing 47 depending from the bottom 44.

Top wall 46 is shaped to peripherally encircle condenser fan 41 and has a screen or guard 48 vertically above the fan to facilitate air flow while preventing debris from impinging on the fan blades.

Additional screens 49 and 50 are disposed in the front and rear walls 45—45 respectively. Within the housing and communicating through a plenum 51, we position an evaporator coil 68 so that air entering from outside the vehicle 10 and passing through the evaporator 68 will be cooled and discharged by evaporator fan 42 into the operator's compartment 16. The plenum 51 additionally serves as a mixing chamber since a manually controllable gated aperture 52, in the roof 22, communicates with an aperture 53 to admit air from the operator's compartment 16 into the plenum 51 for recirculation through the evaporator 68.

A baffle plate 54 serves as a conduit to direct cooled or conditioned air through an aperture 55 to the fan housing 47 from which it is discharged by the fan 42 into the compartment 16.

Referring now to FIG. 7, the refrigerant (preferably Freon or its equivalent) is circulated by a compressor 60 which is driven by a pulley 61 having a pressure or temperature sensitive clutch 62 releasably engaging the pulley 61 to the compressor shaft 63. Pulley 61 is driven by a transmission element or V-belt 64 which is trained about a pulley 65 fixed to the upper extension of motor shaft 31 beneath the condenser fan 41.

As motor shaft 31 rotates, it drives the compressor 60 which, in turn, circulates the Freon through the refrigeration system 66, including, among other common and well-known parts, a condenser coil 67, an evaporator coil 68 with its expansion valve 68' and a reservoir/dryer 69.

Fan 41 draws in atmospheric air from above and passes it through the condenser coil 67 to remove the heat absorbed by the evaporator 68 and exhausts it externally through a screen or filter 50 to the atmosphere.

It should also be noted that the air conditioner of this preferred example is a unitary structure and may be applied to any generally flat surface through which an entrance 70 may be formed to gain access to the compartment for room air. Thus there is a very practical configuration for attachment to innumerable mobile equipment having operator's compartments.

It should also be noted in FIG. 7 that we have provided a refrigerant-oil sump 80 for the compressor 60 because we operate it with the rectilinear movement of the pistons in the horizontal position. Should liquid refrigerant be permitted into the cylinders, damage could occur upon driving the compressor. Therefore, we provide a void 82 in which liquid refrigerant-oil may accumulate to avoid any possibility of its being trapped above a piston in a cylinder.

In FIG. 12 we have shown a crawler tractor 90 which has an enclosed operator's compartment 16 with windows 18—18 in sidewalls 20—20 covered by a roof 22. The unitary air conditioner 40 and the previously described interrelated equipment described with respect thereto are included by inference in the same or similar manner. It is well known that track type tractors create greater quantities of dust than wheel-type tractors and thus the air-conditioning system of this disclosure is eminently desirable in this association.

Having thus described our invention, we desire to secure by Letters Patent of the United States the following:

1. In an air conditioner for a vehicle having an engine and an enclosed operator's compartment, said air conditioner having a compressor, a condenser, an expansion valve and an evaporator, all in a closed fluid refrigerant circulating system, the combination comprising rotary hydraulic pump means driven by the said vehicle engine; a hydraulic motor driven by said hydraulic pump; said hydraulic pump means including means sensing output flow of said pump means for adjusting said pump means to deliver a regulated constant flow of hydraulic fluid above a predetermined minimum speed to drive said motor at substantially constant speed, independent of load on said motor;

power transmission means including clutch means selectively operable for coupling power to said compressor from said hydraulic motor; and first and second air circulating means driven by said hydraulic motor, one of said air circulating means forcing atmospheric air for cooling said condenser and the other air circulating means forcing air through said evaporator and into said compartment; whereby said first and second air circulating means are driven at substantially constant speed independent of the load on said motor.

2. The apparatus of claim 1 wherein said motor has a housing and a single rotatable shaft, said first and second air circulating means each comprising a fan mounted directly to said motor shaft.

3. The apparatus of claim 2 wherein said shaft is disposed in vertical position and has first and second ends extending respectively out of said housing, said apparatus further comprising means for mounting said fans to opposite ends of said shaft in vertically spaced relation;

upper and lower bearings adjacent respectively the ends of said shaft in said motor housing; and a case drain in said motor housing at the upper end and adapted to cause hydraulic fluid to lubricate said upper bearing.

4. The apparatus of claim 1 wherein said fluid refrigerant circulating system has a selectively adjustable flow control valve therein, said sensing means being responsive to the pressure across said flow control valve to adjust the flow rate of said pump means.

5. The apparatus of claim 1 further comprising a radiator in said closed hydraulic system disposed in the air flow through said condenser for cooling the hydraulic fluid therein.

6. The apparatus of claim 1 wherein said compressor has a refrigerant-oil sump reservoir below its compression chamber to collect liquid refrigerant-oil which may seep from the fluid refrigerant-oil circulating system.

7. In combination with a vehicle having an enclosed operator's compartment partially defined by a horizontal support surface and having an engine, an air-conditioning system comprising: variable-displacement, constant-flow hydraulic pump means driven by said engine for pumping hydraulic fluid at a generally constant rate independent of variations in the speed of said engine; hydraulic motor means carried by said support surface and having a rotating shaft with two exterior ends and its axis extending vertically and partially through said support surface; a condenser coil and an evaporator coil carried by said housing means separating said coils; compressor means driven by said hydraulic motor means for compressing refrigerant received from said condenser coil and transmitting the compressed refrigerant to said evaporator coil; a condenser fan mounted directly to one exterior end of said motor shaft for forcing atmospheric air through said condenser coil; an evaporator fan mounted directly to the other exterior end of said motor shaft for forcing air through said evaporator coil; and clutch means for selectively coupling said motor means to drive said compressor means.

8. The apparatus of claim 7 wherein said pump means further comprises a variable orifice valve in the discharge circuit of said pump; and means sensing the pressure differential across said valve for controlling the displacement of said pump to maintain a substantially constant output flow.

9. The apparatus of claim 8 further comprising a shut-off valve in circuit with said pump means for actuation by an operator, whereby when said shut-off valve is closed, said pump means de-strokes in response thereto.

10. An air-conditioning system for a vehicle having an enclosed operator's compartment with a roof and having an engine, comprising: a constant flow pump driven by said vehicle engine for delivering hydraulic fluid to an outlet conduit; a control valve having an adjustable orifice in said outlet conduit; sensing means sensing the pressure differential across said control valve for reducing the stroke of said pump when said pressure exceeds a predetermined value and for increasing the stroke of said pump when said pressure is beneath said predetermined value; and a unit carried on said roof of said vehicle adjacent an access aperture therein, said unit including hydraulic motor means having a housing and a shaft extending in a vertical disposition through opposing sides of said housing, one end of said shaft extending above said housing; a condenser coil and an evaporator coil in said housing, means for separating said coils into separate air paths, a condenser fan mounted directly to said one end of said motor shaft for forcing atmospheric air centrally downwardly and thence through said condenser fan and rearwardly of said housing, an evaporator fan mounted to the other end of said rotatable shaft; compressor means driven by said rotatable shaft for compressing refrigerant received from said condenser coil and transmitting the compressed refrigerant to said evaporator coil; said outlet conduit being coupled to deliver hydraulic fluid from said pump to said motor; and clutch means for selectively coupling said motor to drive said compressor.

* * * * *